United States Patent

[11] 3,564,987

[72] Inventor Harry S. Jones
 Monmouth Beach, N.J.
[21] Appl. No. 649,308
[22] Filed June 27, 1967
[45] Patented Feb. 23, 1971
[73] Assignee Chrom-Tronics, Inc.
 New York, N.Y.

[54] CAMERA CONSTRUCTION FOR 3-D PHOTOGRAPHY
 8 Claims, 8 Drawing Figs.

[52] U.S. Cl. .................................................. 95/18, 352/58
[51] Int. Cl. .................................................. G03b 35/00
[50] Field of Search ................................. 352/44, 53, 57, 58; 95/18, 18 (P)

[56] References Cited
UNITED STATES PATENTS
2,063,985 12/1936 Coffey ........................... 95/18
2,174,003 9/1939 Ives ............................. 95/18
3,301,154 1/1967 Stewart ........................ 95/18P
3,447,438 6/1969 Kaufer ......................... 95/15
FOREIGN PATENTS
1,049,316 12/1953 France ......................... 95/18
399,045 9/1933 Great Britain .................. 352/58

Primary Examiner—John M. Horan
Assistant Examiner—Monroe H. Hayes
Attorneys—Albert C. Johnston, Robert E. Isner, Lewis H. Eslinger and Alvin Sinderbrand ABSTRACT: A camera construction for securing three-dimensional images in snapshot photography having a stack of at least three multielement lens overlays disposed closely adjacent to a photosensitive film with the lens elements thereof being sized and constituted as to effect the direct deposition of normal relief images from a remotely located wide aperture lens upon said photosensitive film.

INVENTOR
HARRY S. JONES

INVENTOR
HARRY S. JONES
ATTORNEY.

CAMERA CONSTRUCTION FOR 3-D PHOTOGRAPHY

This invention relates to relief photography and more particularly to improved constructions for securing relief photographic images in snapshot type photography.

The obtaining of relief or three-dimensional images or effects in the photographic arts has, for many years, challenged the skilled workers in this field. While the basic theory and the nature of the problems involved have long been known and understood, the present day dearth of simple, commercially-practical and inexpensive relief photographs and methods of obtaining the same cogently demonstrate the continued inability of the art to solve the problems involved.

The prior efforts in this field reveal both simple and complicated systems having various advantages and limitations and which are divisible into three general classes. The first of these involves the taking of two photographs of a subject using one or two camera lenses located at two different positions relative to the subject. Such photographs are usually referred to as a stereo pair.

The second class obtains the relief effect essentially by the taking, through a single camera lens of small aperture, of a continuous series of photographs of the subject as viewed from a continuous series of positions relative to a camera lens and recording the series through an array of very small auxiliary lenses or apertures disposed intermediate the primary lens and the photograhic film plane so that an image of the single lens aperture is focused upon the film by each of such auxiliary lenses or apertures. The third broad class involves the use of a single camera lens, usually of large diameter, in association with a grating or lenticular system disposed intermediate the camera lens and the film plane and requires no relative motion between the subject and the camera lens.

Simple forms of apparatus for the first class delineated above involve old and well-known techniques and were included in the familiar "stereoscope." Apparatus of the second class, although comprehensively disclosed in the patented art, has not as yet been widely used due to the bulk and complexity of the apparatus necessary to provide the requisite relative movement between the camera and the subject. Apparatus usable in the third category or system avoids the problems inherent in the provision and control of relative motion, however, the previously-existing forms of such apparatus require the inclusion of complicated and usually expensive means of limited effectiveness in order to correct the abnormal relief images obtained with such apparatus.

This invention may be briefly described as an improved construction for securing relief photographic images in snapshot photography whereby a single camera lens may be employed to directly obtain true or normal relief photographic images without the need for incorporating any relative motion between the camera and subject and/or between the film and lenticular elements, or the camera lens and the film and lenticular elements. In more narrow aspects the subject invention includes a camera construction incorporating a multielement lenticular system made up of a plurality of multielement lens overlays disposed closely adjacent the film and so sized and constituted as to effect the direct deposition of true relief images on the film emulsion through a single large lens.

The primary object of this invention is to provide an improved camera construction to provide true relief photographic images in snapshot photography.

Other objects and advantages of the invention will be apparent from the following portions of this specification and from the accompanying drawings which illustrate the principles of this invention as incorporated in exemplary presently preferred embodiments thereof.

Referring to the drawings.

As will become hereinafter apparent, the constructions herein of concern are all directed to the provision of a "true" or "normal" as distinguished from an "abnormal" relief or three-dimensional image in snapshot photography. By way of definition herein, an "abnormal" relief or three-dimensional image is one in which the left side of the subject image (relative to the viewer) will be increasingly revealed as the viewer's head is moved to the right and vice versa. In contradistinction therewith a true or normal image is one in which the left side of the subject image (relative to the viewer) will be increasingly revealed as the viewer's head is moved to the left as per normal observation of a three-dimensional object.

The major elements of the subject constructions hereinafter described are, at the present time and for economic reasons, preferably includable as a camera component either in the form of a permanently installed and integral subassembly or as a reuseable component of an insertable film holder assembly. The inclusion of the subject construction as a component of a disposable film pack, although practically feasible from an operational standpoint, would appear to be precluded for economic reasons at the present time.

Figures 1, 1A:
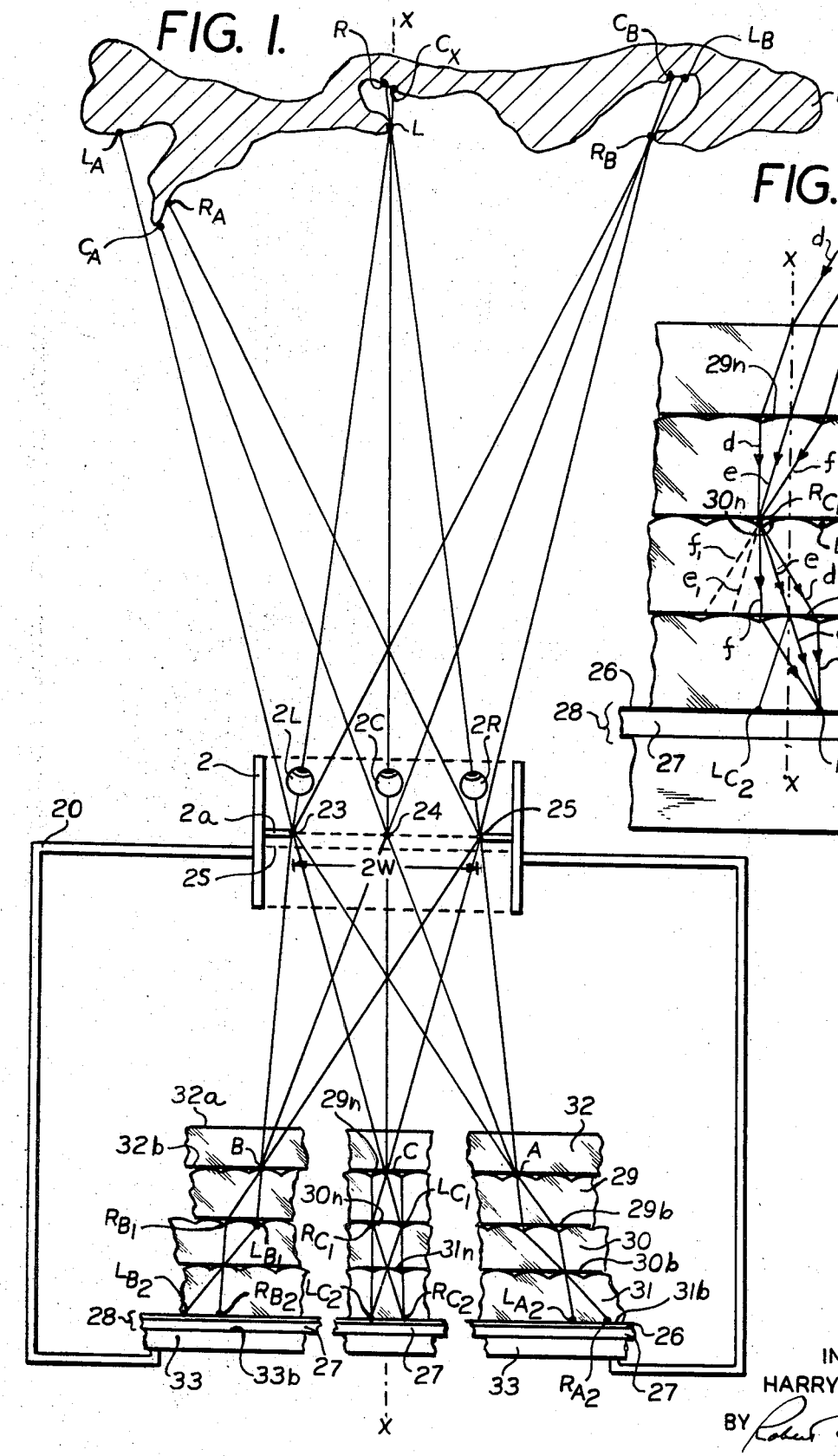
FIG. 1 is a schematic plan view, with certain elements being of exaggerated and/or disproportionate size for the purposes of clarity, of a camera construction incorporating the principles of this invention.
FIG. 1A is an enlarged fragmentary view of a modification of the composite lenticular system illustrated in FIG. 1.

Referring to the drawings and initially to FIG. 1, there is provided a camera body 20 containing a single large aperture lens generally designated 2, a rectangular aperture 2a and an adjacent shutter 2s. For natural relief, the rectangular aperture 2a preferably has a width 2w comparable with the spacing between the human eyes (about 63 mm.). However, lens 2 and aperture width 2w may be made larger for exaggerative relief effects or smaller if small subjects only are to be photographed. Disposed remote from the lens 2 and beyond the focal point thereof is a backing plate 33 whose inwardly facing surface 33b serves to support the base substrate 27 of film 28 with its emulsion side 26 facing lens 2.

For most purposes lens 2 should be a lens of relatively low $f$ member so that the angle between the points 23 and 25 is relatively large as seen from the focal points A, B or C in its focal plane. Lens 2 should usually be of such size as to allow an aperture width 2w slightly greater than the human eye spacing so that it will possess a base equivalent to that between a left eye 2L and a right eye 2R.

Disposed in adjacent overlying relation with the emulsion side 26 of the film is a multielement lenticular system comprising a plurality of relatively thin, planar cylindrical lens overlays, generally designated 29, 30 and 31 respectively, surmounted by a rigid transparent plate 32 having optically flat upper and lower surfaces 32a and 32b and which serves to maintain the cylindrical lens overlays in fixed positional relation with each other and with the film 28 and backing plate 33. Each of the cylindrical lens overlays constitutes an array of optically smooth small cylindrical lenses 29n, 30n and 31n formed on one surface of a transparent base and the plurality of lens overlays compositely function to provide an erect image of the aperture 2a on the film emulsion.

As is or will become apparent to those skilled in this art, an array of small spherical lenses can be used in lieu of an array of cylindrical lenses as mentioned above and a spherical lens overlay is considered to be a full equivalent of a cylindrical lens overlay in the practice of this invention. A close approximation of a spherical lens array can be obtained by employing two cylindrical lens overlays with the curved lens elements disposed in facing relation and with the lens axes disposed perpendicular to each other as shown in U.S. Pat. No. 2,622,472 and in FIG. 4A of this disclosure.

In the described construction, the undersurface 32b of the transparent plate 32 is located at the focal plane of the lens 2. Disposed immediately therebeneath is a first cylindrical lens overlay 29 having its optically smooth cylindrical lenses 29n disposed in abutting interfacial contact with the plate undersurface 32b. Disposed beneath the first cylindrical lens overlay 29 and having its cylindrical lens elements 30n disposed in abutting interfacial contact with the optically smooth undersurface 29b thereof is the second transparent cylindrical lens overlay 30. In a similar manner, a third cylindrical lens overlay 31 is disposed beneath the second lens overlay 30 with its lens elements 31n disposed in abutting interfacial contact with the optically smooth undersurface 30b. The optically smooth undersurface 31b of the third overlay 31 is disposed in contact with the emulsion layer 26 on film 28.

In units of the type illustrated wherein the multielement lenticular system is a camera component element, means must be provided for permitting displacement of the film relative to the backing plate 33 and the undersurface 31b of the third lens overlay 31 intermediate exposures thereof. Surface 31b should therefore be formed of or covered by a relatively hard material such as glass or quartz so as to minimize wear and possible abrasion thereof.

As will be apparent to those skilled in this art, the illustrated cylindrical lens overlays are shown of greatly exaggerated size for the purposes of clarity. As will also become apparent from what follows, apart from the actual dimensions employed, the widths of the individual lens elements 29n, 30n and 31n in the FIG. 1 type construction become successively greater in the direction of the film so that off-axis rays passing the point 24 in lens 2 will pass through the center of each successive cylindrical lens element. In such an array, the cylindrical lens elements located on the axis X-X of the lens 2 will be the only lens elements having coincident axes.

For the purposes of clarity and simplicity the following description will consider the rays that pass the edges 23 and 25 of aperture 2a and that pass through the axial center point 24 thereof without consideration of the complex actual path of the rays through the various glass elements of lens 2 that would normally be situated on both sides of aperture 2a and shutter 2s.

FIG. 1, incorporates an arbitrarily shaped irregular three-dimensional object 1, in section, for the purpose of illustration. Rays from small areas around points $C_a$, $C_x$ and $C_b$ will be focused around points A, C and B respectively at or close to undersurface 32b of plate 32 and the particular cylindrical lens element 29n disposed in abutting relationship therewith. Considering first the area around the point $C_x$ on the axis X-X of the lens 2, a right eye 2R view of a point R located close to axis X-X will be furnished by the ray passing point 25 and an appropriate lens element 29n located on the axis X-X will produce an image of point 25 at point $RC_1$ at or close to undersurface 29b of the first cylindrical lens overlay 29. The adjacently disposed lens element 30n of the second lens overlay and corresponding lens element 31n of the third cylindrical lens overlay function to contain the ray within the column of adjacent cylindrical lens elements and also to image said point $RC_1$ on point $RC_2$ on the emulsion surface 26 of film 28.

In a similar manner the rays from the area around point L, from a left eye 2L view thereof will be furnished by the ray passing point 23 and the same lens element 29n on the axis X-X heretofore referred to will produce an image of point 23 at point $LC_1$ at or close to the undersurface 29b of the first cylindrical lens element 29. Likewise the second and third cylindrical lens elements will function, in the manner illustrated, to image said point $LC_1$ on point $LC_2$ situated on the emulsion surface 26 of film 28.

In a similar manner, the rays from the points $R_B$ and $L_B$ will be first focused at points $R_{B1}$ and $L_{B1}$ at or near the undersurface 29b of the first cylindrical lens overlay 29 and the second and third lens overlays will image the same at points $R_{B2}$ and $L_{B2}$ respectively on the emulsion 26 of film 28. So also will the rays from $R_A$ and $L_A$ be imaged at points $R_{A2}$ and $L_{A2}$ respectively on the emulsion 26 of film 28.

It will now be apparent from the foregoing that a continuous series of points on the object 1 will also be imaged on the film emulsion 26 between points $L_{C2}$ and $R_{C2}$ corresponding to eye positions between 2L and 2R respectively and corresponding to points between R and L on the subject 1. Thus the exposed emulsion 26 beneath each stack of cylindrical lens elements will contain all the views from right to left for each image element in the focal plane.

Referring now to FIG. 1A, the ray bundle emanating from point R adjacent the axis X-X which passes point 25 is shown, on enlarged scale, as having three components, i.e. rays d, e, and f. These rays may be considered as originating from a small portion of lens 2 and can be considered therefore as nearly parallel. These rays, after a slight refraction by plate 32, are first focused at point $R_{C1}$ by the first cylindrical lens overlay 29 and then refocused at point $R_{C2}$ by the second and third lens overlays 30 and 31. As shown by the dotted lines, the theoretical rays, $e_1$ and $f_1$ are prevented from pursuing an unrefracted path by the interposition of the second cylindrical lens overlay 30 which directs the same into the spaces under overlay elements 29, 30 and 31 to be there dissipated.

To provide the focal function described in connection with FIG. 1A above, the focal length of the second and third cylindrical lens overlays 30 and 31 should be approximately one-half the focal length of the first cylindrical lens overlay 29, that is, the radii of the lens elements 30n and 31n should be about half the radii of lens elements 29n. To provide identical field angles the thicknesses of the lens overlays 29, 30 and 31 should preferably be the same.

Figure 2:
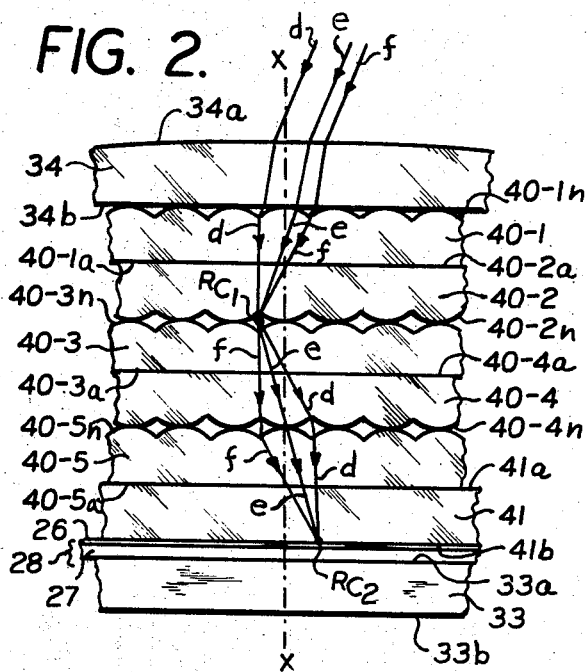
FIG. 2 is an enlarged fragmentary view of an alternate lenticular construction incorporating the principles of this invention.

FIG. 2 shows an alternate construction for a multielement lenticular system which incorporates five cylindrical lens overlays of identical design. In this embodiment a large cylindrical or spherical lens 34 replaces the flat plate 32 shown in FIGS. 1 and 1a. The lens 34 serves to collimate the off-axis impinging rays to more approximate parallelism and to thereby permit the individual cylindrical lens overlays to be of similar, if not identical, configuration and to incorporate the same number of cylindrical lens elements per unit of length in all layers. As illustrated in the multielement lenticular system disposed beneath the lens 34 and herein of concern includes five cylindrical lens overlays of similar, if not identical, construction, and designated 40 - 1, 40 - 2, 40 - 3, 40 - 4 and 40 -5 respectively. Each of these lens overlays is of an effective thickness that closely approximates, if not equals, one-half of the focal length of its cylindrical lens elements as measured in the lens material. The first and second overlays 40 - 1 and 40 - 2 have their optically flat plane surfaces 40 - 1a and 40 - 2d disposed in facing relationship and likewise the optically flat plane surface 40 - 3a and 40 - 4a of the third and fourth overlays are similarly disposed. The lens elements 40 - 5n of the fifth overlay 40 - 5 are disposed in facing relation with the lens elements 40 - 4n of the fourth overlay 40 - 4 and a transparent flat plate 41 of a thickness approximating that of the overlays is disposed intermediate the undersurface 40 - 5a thereof and the emulsion 26 of the film 28 to provide for proper focus of points such as $R_{C2}$ on the emulsion 26. In the described system the cylindrical lens elements 40 - 1n of the first lens overlay 40 - 1 are optically equivalent to the cylindrical lens elements 29 n and elements 40-2n and 40-3n in combination are optically equivalent to the cylindrical lens elements 30n in FIG. 1 and FIG. 1A. Similarly, elements 40-4n and 40-5n in combination are equivalent elements 31n in FIGS. 1 and 1A.

If desired, the spacing between the optically flat surfaces 41a and 41b of the insert plate 41 may be varied slightly if necessary to correct errors in the focal plane of point $R_{C2}$ on film emulsion 26. Also, if necessary or desired, thin film sheets may be inserted or removed as optical "shims" between the various flat facing surfaces of the various lens overlay elements including the spacer plate 41.

In a manner similar to that heretofore described in conjunction with FIG. 1a, rays d, e and f are shown in FIG. 2 to demonstrate the transfer of point $R_{C1}$ through the third, fourth and fifth cylindrical lens overlays 40-3, 40-4 and 40-5 respectively and through the spacer plate 41 to image at point $R_{C2}$ on the emulsion surface 26 of film 28.

As was the case with the FIG. 1 embodiment, the surface 41b of the spacer plate facing the film emulsion should be formed of or covered by a relatively hard material such as glass, quartz or sapphire so as to minimize wear and abrasion thereof.

As will now be apparent to those skilled in this art, a normal relief or three-dimensional image will be observable if a single cylindrical lens overlay similar to the lens overlay 40-5 together with its spacer plate 41 in FIG. 2 is placed over film 28 for viewing after processing the latter as a transparency and if such overlay is positioned in proper horizontal alignment, that is, with the lens axes of the viewing overlay parallel and coincident with the lens axes of overlays 40-1, 40-2, 40-3, 40-4 and 40-5 as the same were located during exposure. Similar viewing results may be obtained from positive prints made from the processed film, from rapid-processing film of the Polaroid type, or lithographed or offset reproductions of such film.

A top-side-up, right-side-right overall image with normal relief will be observed when the lens array used for viewing is placed with the plane of its lens elements in the position of surface 33b in FIG. 2 and when the photograph is properly oriented.

Figure 3B:
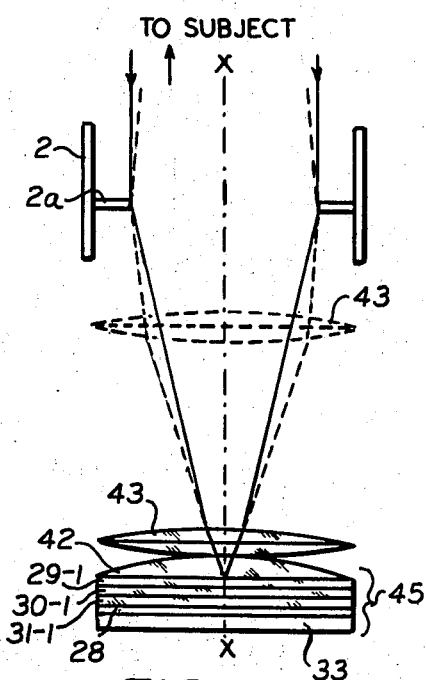
FIG. 3B is a modification of the construction illustrated in FIG. 3.
Figure 3:
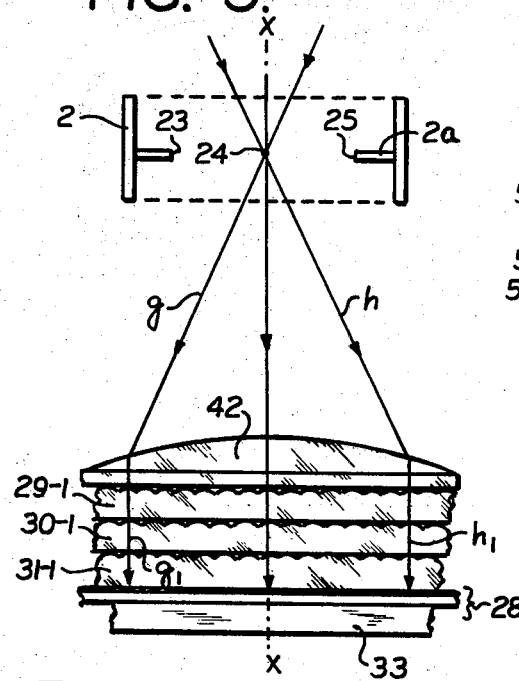
FIG. 3 is a schematic top view of a modification of the construction shown in FIG. 1.
Figure 3A:
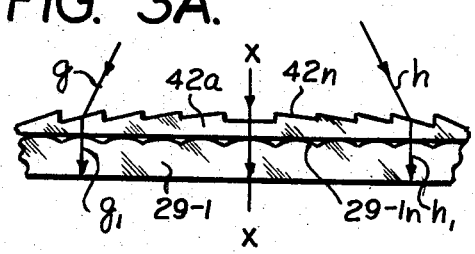
FIG. 3A is a schematic fragmentary representation of a modified component for use in the system in FIG. 3.

FIG. 3 illustrates a lenticular system having three cylindrical lens overlays 29-1, 30-1 and 31-1 as generally heretofore shown and described in conjunction with FIGS. 1 and 1A. Herein, however, the transparent pressure plate 32 is replaced by a large cylindrical or spherical lens 42 which serves to collimate the off-axis rays (g and h) into approximate parallelism as in rays $g_1$ and $h_1$. As pointed out earlier, the use of such lens 42 permits the cylindrical lens overlays to be similar, if not identical, in construction and permits each to have the same number of cylindrical lens elements per unit of length. If desired either a circular, linear or any other suitable Fresnel lens 42a may be employed in lieu of lens 42. If the Fresnel lens is linear, each Fresnel lens element 42n should, preferably, be of the same width as each cylindrical lens element as shown in FIG. 3A and the edges of each Fresnel element 42n should lie directly over the cusps of adjacent cylindrical elements 29-1n. As a practical matter, since the composite thickness of the stack of cylindrical lens overlays, as for example, overlays 29-1, 30-1 and 31-1, is small compared with the focal length of lens 2, the lens 42 may, for practical purposes constitute a cylindrical lens with its axis parallel with the axes of the lenses of the cylindrical lens overlays 29-1, 30-1 and 31-1 since only negligible distortion of the overall picture height-to-width ratio will be introduced thereby.

In the system described above and shown in FIG. 3, the collimated off-axis rays will be disposed in approximate parallelism for only one object distance and such will serve to limit the operative range of the unit. Thus if the subassembly consisting of lens 42, overlays 29-1, 30-1 and 31-1, the film 28 and backup plate 33 is moved as a unit along axis X–X to obtain a sharp focus when the object distance is changed, the rays $g_1$ and $h_1$ will no longer be parallel. Since the overlays 29-1, 30-1 and 31-1 may permissibly have the same number of cylindrical lens elements per unit of length only when rays $g_1$ and $h_1$ are approximately parallel, such system will yield spurious effects or become inoperative if a substantial focal change is made. As previously described lens 42 may be replaced by one of the Fresnel type such as 42a.

FIG. 3B illustrates a basic modification in the construction of FIG. 3 to cure the above-noted operational limitation and which will permit off-axis rays $g_1$ and $h_1$ to be maintained in substantial parallelism as the subject distance is varied. If the stack 45 consisting of overlay elements 29-1, 30-1, 31-1, lens 42 and film 28 is supplemented with an auxiliary lens 43 which, when located close to lens 42, focuses the image formed by lens 2 for very distant objects in close coincidence with the first cylindrical lens overlay 29-1, then by moving lens 43 away from lens 42, as shown by the dotted lines, less distant objects may be sharply focused. However, when lens 43 is moved as above-indicated and overlay stack 45 is held fixed in position, the combination of lenses 42 and 43 will no longer provide collimated rays within the overlay stack 45 if they provided such collimation when lens 43 was in the position shown by the solid lines. This condition is readily corrected by providing for concomitant movement of lens overlay stack 45 away from the lens 2, while the lens 43 is moved toward lens 2 and as near subjects are focused on cylindrical lens overlay 29-1. When both lenses are complementarily so moved, the off-axis rays $g_1$ and $h_1$ may be maintained in approximate parallelism while nearer objects are focused on the elements of the first lens overlay 29-1.

Figure 4:
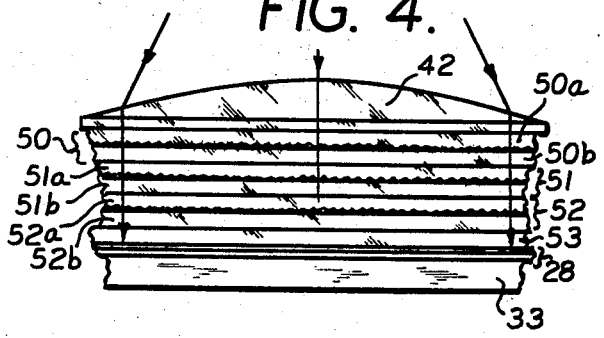
FIG. 4 is a schematic representation of a construction similar to FIG. 3 and incorporating crossed cylindrical lens overlays in accordance with the principles of this invention.
Figure 4A:
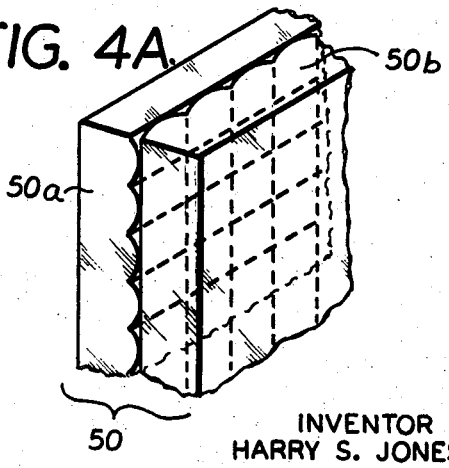
FIG. 4A is an enlarged fragmentary view illustrating crossed cylindrical lens overlays of the type employed in the construction of FIG. 4.

FIG. 4 schematically illustrates the essentials of a multielement lenticular system in which crossed cylindrical lens arrays are used to provide an operational equivalent of an array of spherical lenses to provide true three-dimensional pictures in which the relief effect is vertical as well as horizontal, and in all directions between. In FIG. 4 and as shown in enlarged scale in FIG. 4A, the first effective spherical lens overlay 50 is compositely formed of a pair of crossed cylindrical lens overlays 50a and 50b and the resulting equivalent spherical lens overlay may be used in lieu of lens overlay 29 in FIGS. 1 and 1A. Similarly, crossed cylindrical lens overlays 51a and 51b result in an equivalent spherical lens overlay 51, and crossed cylindrical lens overlays 52a and 52b result in an equivalent spherical lens overlay 52 which may be used in lieu of lens overlays 30 and 31 in FIGS. 1 and 1A. When auxiliary spherical lens 42 and/or 43 is used lens overlays for units 50, 51 and 52 may all have identical numbers of lenses per unit of length.

Although more difficult and expensive to fabricate, actual spherical lens overlays or slightly aspheric lens overlays could, of course, be substituted for two identical crossed cylindrical lens overlay elements used to form the equivalent spherical elements such as 50, 51 and 51 to provide omnidirectional pictures having true or normal relief viewing characteristics. Of course, in such spherical lens systems the rectangular aperture plate is omitted and the full aperture of the lens 2 is employed.

Film 28 may be replaced by a single or double-layered lenticulated film, as for example, of the type disclosed in my copending application Ser. No. 649,309, filed June 27, 1967. However, when such lenticulated film is used the relief will still appear normal and the overall image will appear right-side-right but will also appear top-side-down when the photograph is properly oriented. However, this defect can be corrected by the use of a plane inverting mirror on either side of camera lens 2, or by any other suitable means. This problem, of course, does not arise where a separate lens array is used with conventional film since the lens overlay used for viewing may be placed with its flat surface adjacent to the base side of the film.

As will now be apparent to those skilled in this art, the heretofore described constructions are readily includable in a camera or in a reusable film holder therefor and will function to provide true or normal relief or three-dimensional images without any relative motion between the lens array and the film, or between the subject and camera. As will also be apparent the subject constructions could be included in a disposable film pack although cost considerations appear to preclude commercial utilization of such character.

I claim:
1. In a camera construction, in combination:
a primary lens having an aperture;
a photosensitive film disposed remote from said lens;
a multielement lenticular system disposed closely adjacent to said film comprising:

a first lenticular surface formed of a multiplicity of individual essentially coplanar lens elements disposed remote from said primary lens for forming a multiplicity of focused inverted images of said primary lens at a first location intermediate said first lenticular surface and said photosensitive film;

a second lenticular surface formed of a multiplicity of individual essentially coplanar lens elements disposed closely adjacent the focal plane surface of the lens elements forming said first lenticular surface for collimating the inverted images focused by the lens elements of said first lenticular surface; and a third lenticular surface formed of a multiplicity of individual essentially coplanar lens elements disposed intermediate said second lenticular surface and said photosensitive film and substantially equidistant therefrom for inverting the inverted images formed by said first lenticular surface and collimated by said second lenticular surface and focusing the same on said photosensitive film for compositely forming a multiplicity of erect images of the aperture of said primary lens upon said photosensitive film.

2. The camera construction as set forth in claim 1 wherein said third lenticular surface is formed of lens elements of different optical shape from that of said first and second lenticular surfaces for maintaining the degree of collimation effected by said second lenticular surface.

3. The camera construction as set forth in claim 2 wherein said lens elements are of different width.

4. The camera construction as set forth in claim 1 wherein each of said first, second and third lenticular surfaces is formed of lens elements of substantially the same size and radius of curvature.

5. The camera construction as set forth in claim 1 wherein the radii of curvature of the lens elements on the first of said lenticular surfaces differs from that of both the second and third lenticular surfaces.

6. The camera construction as set forth in claim 1 including collimating lens means disposed closely adjacent said first lenticular surface.

7. The camera construction as set forth in claim 1 including an auxiliary focusing lens selectively positionable intermediate said primary lens and said multielement lenticular system.

8. In a camera construction, in combination:

a primary lens having an aperture;

a photosensitive film disposed remote from a said lens; and a multielement lenticular system disposed closely adjacent to said film comprising at least five discrete lenticular surfaces each formed of a multiplicity of individual essentially coplanar lens elements of substantially identical width and curvature disposed in predetermined spaced relation relative to the film and to each other for compositely forming a multiplicity of erect images of the aperture of said lens upon said photosensitive film.